United States Patent
Hart

(10) Patent No.: US 10,294,046 B2
(45) Date of Patent: May 21, 2019

(54) LOADING SYSTEM

(71) Applicant: John E. Hart, Warwick (AU)

(72) Inventor: John E. Hart, Warwick (AU)

(73) Assignee: John E. Hart, Warwick (AU)

( * ) Notice: Subject to any disclaimer, the term of this patent is extended or adjusted under 35 U.S.C. 154(b) by 0 days.

(21) Appl. No.: 15/561,475

(22) PCT Filed: Mar. 24, 2016

(86) PCT No.: PCT/AU2016/050225
§ 371 (c)(1),
(2) Date: Sep. 25, 2017

(87) PCT Pub. No.: WO2016/149767
PCT Pub. Date: Sep. 29, 2016

(65) Prior Publication Data
US 2018/0050876 A1 Feb. 22, 2018

(30) Foreign Application Priority Data

Mar. 24, 2015 (AU) .................................. 201501060

(51) Int. Cl.
*B65G 67/08* (2006.01)
*B65G 21/10* (2006.01)
*B65G 41/00* (2006.01)
(52) U.S. Cl.
CPC .............. *B65G 67/08* (2013.01); *B65G 21/10* (2013.01); *B65G 41/002* (2013.01); *B65G 41/005* (2013.01); *B65G 2201/025* (2013.01)

(58) Field of Classification Search
CPC ...... B65G 67/08; B65G 21/10; B65G 41/002; B65G 2201/025
See application file for complete search history.

(56) References Cited

U.S. PATENT DOCUMENTS

| 3,780,843 | A | * | 12/1973 | McGovern, Jr. ........ | B65G 13/12 193/35 TE |
| 3,837,510 | A | | 9/1974 | McWilliams | |
| 3,931,897 | A | * | 1/1976 | Bacon .................... | B65G 67/08 414/789.8 |

(Continued)

FOREIGN PATENT DOCUMENTS

| CA | 2944374 A1 * | 10/2015 | .......... B25J 15/0014 |
| DE | 102015003239 A1 * | 9/2016 | ............. B65G 21/14 |

(Continued)

OTHER PUBLICATIONS

PCT/AU2016/050225, "International Search Report and Written Opinion", dated May 4, 2016, 8 pages.

*Primary Examiner* — Kaitlin S Joerger
(74) *Attorney, Agent, or Firm* — Kilpatrick Townsend & Stockton LLP

(57) ABSTRACT

A loading and unloading machine for loading goods into, or unloading goods from, a container such as a standard shipping container. The loading and unloading machine has a goods conveyor extending into the container and configured to convey goods to or from the container, a transfer system located adjacent an end of the goods conveyor configured to maneuver goods from or to the loading machine into or from the container, respectively, and a height adjustment system configured to adjust the height of the transfer system to a desired height.

22 Claims, 9 Drawing Sheets

(56) References Cited

U.S. PATENT DOCUMENTS

| | | | | | |
|---|---|---|---|---|---|
| 3,993,204 | A | * | 11/1976 | Hummel | B65G 21/14 104/89 |
| 4,281,955 | A | * | 8/1981 | McWilliams | B65G 21/14 198/303 |
| 5,921,740 | A | | 7/1999 | Stewart | |
| 6,484,862 | B1 | * | 11/2002 | Gilmore | B65G 21/14 193/35 TE |
| 7,370,753 | B2 | * | 5/2008 | Yang | B65G 21/14 193/35 TE |
| 9,315,345 | B2 | * | 4/2016 | Girtman | B65G 61/00 |
| 9,511,943 | B2 | * | 12/2016 | Mast | B65G 21/10 |
| 9,517,492 | B2 | * | 12/2016 | Schwarzbauer | B65G 67/08 |
| 9,555,982 | B2 | * | 1/2017 | Girtman | B25J 9/0093 |
| 9,604,797 | B2 | * | 3/2017 | Heitplatz | B65G 67/08 |
| 9,738,463 | B2 | * | 8/2017 | Wicks | B65G 61/00 |
| 2012/0255835 | A1 | * | 10/2012 | Date | B65G 41/005 198/588 |
| 2017/0096308 | A1 | * | 4/2017 | Girtman | B25J 9/0093 |

FOREIGN PATENT DOCUMENTS

| | | | | |
|---|---|---|---|---|
| JP | 61-211237 A | | 9/1986 | |
| WO | WO-9851598 A1 | * | 11/1998 | B65G 59/02 |
| WO | WO-2016075286 A1 | * | 5/2016 | B65G 67/08 |
| WO | WO-2016149767 A1 | * | 9/2016 | B65G 67/08 |

\* cited by examiner

LOADING SYSTEM

FIELD OF THE INVENTION

The invention relates to a loading system. In particular, the invention relates, but is not limited, to a system of loading goods, preferably boxed goods, into a container, preferably a standard freight container such as a shipping container, using a substantially automated loading machine.

BACKGROUND TO THE INVENTION

Reference to background art herein is not to be construed as an admission that such art constitutes common general knowledge.

It is common in modern society for goods to be freighted significant distances. Typically goods are loaded into freight containers and the containers are freighted to their destination. The type of container is often determined by the type of transportation involved, such as air freight or sea freight. However all types of containers require loading. In the meat export industry the container is loaded with a plurality of pre-packaged cartons. The cartons are heavy and the contents can be damaged by rough handling.

In many cases the loading of a container is a manual process. Labourers take the goods to be loaded, transfer them into the container, then manually stack the goods in a pre-organised loading pattern. Not only is this process slow, labour intensive, and time consuming, but it can also result in damage to the goods and injury to the labourer. Poor handling and stacking can make goods unusable. Injury can occur from carrying heavy loads, collisions, over exertion, and/or falling when loading goods at a height, when loading shipping containers.

OBJECT OF THE INVENTION

It is an aim of this invention to provide a loading system which overcomes or ameliorates one or more of the disadvantages or problems described above, or which at least provides a useful alternative.

Other preferred objects of the present invention will become apparent from the following description.

SUMMARY OF INVENTION

In one form, although it need not be the only or indeed the broadest form, there is provided a loading and/or unloading machine comprising:
 a goods conveyor configured to convey goods into and/or out of a container;
 a transfer system located adjacent an end of the goods conveyor, the transfer system being configured to transfer goods from the loading machine into the container and/or from the container onto the loading machine; and
 a height adjustment system configured to adjust the height of the transfer system to a desired height.

In another form, there is provided a container loading and/or unloading system comprising:
 a container to be loaded or unloaded with a plurality of goods; and
 a loading and/or unloading machine comprising:
  a goods conveyor extending into the container and configured to convey goods from outside the container into the container and/or from inside the container to outside the container;
  a transfer system located adjacent an end of the goods conveyor, the transfer system being configured to manoeuvre goods from the loading machine into the container and/or from the container onto the loading machine; and
  a height adjustment system configured to adjust the height of the transfer system to a desired height.

In a form the loading and/or unloading machine may comprise a loading machine, with the goods conveyor being configured to convey goods from outside the container into the container and with the transfer system being configured to manoeuvre goods from the loading machine into the container. In another form the loading and/or unloading machine may comprise an unloading machine, with the goods conveyor being configured to convey goods from inside the container to outside the container and with the transfer system being configured to manoeuvre goods from the container onto the loading machine. In a preferred form, the loading and/or unloading machine is capable of selectively operating as a loading machine or an unloading machine.

Preferably the transfer system comprises a support platform. Preferably the support platform comprises a transfer comb. Preferably the transfer system comprises a pusher. Preferably the pusher is configured to push goods off the support platform. Preferably the pusher is driven by a linear actuator. Preferably the linear actuator is an electrical actuator, or a pneumatic or hydraulic cylinder. Preferably the pusher is configured to push a plurality of goods arranged on the support platform simultaneously.

The pusher may comprise a first pushing portion and a second pushing portion. Preferably the first pushing portion and second pushing portion are configured to push simultaneously. Preferably the second pushing portion comprises an extender that enables the second pushing portion to extend further than the first pushing portion.

Preferably the transfer system comprises a staging conveyor. Preferably the staging conveyor is located adjacent the goods conveyor. Preferably the staging conveyor is configured to receive goods from the goods conveyor. Preferably the staging conveyor arranges the goods along the support platform. Preferably the staging conveyor is transverse to the goods conveyor. Preferably the staging conveyor is arranged substantially perpendicularly to the goods conveyor. Preferably the support platform extends substantially the width of the container.

Preferably the goods conveyor extends substantially longitudinally within the container. Preferably the goods conveyor comprises a series of rollers. Preferably the loading and/or unloading machine has a goods alignment device to align the goods on the goods conveyor. Preferably the alignment device comprises one or more alignment members that extend over the goods conveyor. Preferably the alignment device comprises two alignment members. Preferably the alignment members have an inclined surface relative to a longitudinal axis of the goods conveyor. Preferably the alignment members are movable. Preferably the alignment members are movable to extend or retract across the path of the goods conveyor.

Preferably the loading and/or unloading machine has a goods orientation device to orient the goods in a desired orientation. Preferably the goods orientation device selectively reorients goods by rotating the goods by approximately 90°. Preferably alignment members of the alignment device are configured to align the goods depending on the orientation of the goods from the orientation device.

Preferably the goods orientation device comprises an orientation member that selectively interrupts the path of the goods as they traverse the goods conveyor. Preferably the goods orientation device comprises a roller. Preferably the goods orientation member is an arm. Preferably the roller is located at an end of the arm. Preferably the goods orientation member extends partially across the goods conveyor when in a reorientation position. Preferably the goods orientation member extends less than half way across the width of the goods conveyor when in a reorientation position. Preferably the orientation member is substantially retracted from the path of goods on the goods conveyor when in a non-reorientation position.

Preferably the goods conveyor comprises at least one ramp that extends between a first height portion of the goods conveyor and a second height portion of the goods conveyor. Preferably the ramp is inclined between the first height portion of the goods conveyor and a second height portion of the goods conveyor. Preferably the first height portion of the goods conveyor is a fixed height portion. Preferably the second height portion of the goods conveyor is a variable height portion.

In a form the loading and/or unloading machine may comprise a plurality of transfer systems. In a form the loading and/or unloading machine may comprise two transfer systems. Preferably the plurality of transfer systems are located in parallel planes. Preferably the plurality of transfer systems are located at different heights. The height adjustment system may adjust the height of both of the transfer systems. Alternatively, each transfer system preferably has a corresponding height adjustment system. Preferably the transfer systems can operate simultaneously.

Preferably the height adjustment system comprises a goods height sensor. Preferably the goods height sensor is configured to determine the height of goods already loaded into the container.

Preferably the loading and/or unloading machine comprises a frame. Preferably the frame supports at least the transfer system and height adjustment system. Preferably the loading and/or unloading machine comprises a movement system to traverse the container. Preferably the movement system comprises wheels. Preferably the movement system is configured to move the frame within the container.

Preferably the goods are cartons. Preferably the cartons are of substantially standard sizes and shapes. Preferably the goods orientation member is configured to selectively reorient only a portion of the cartons.

Preferably the container is a standard freight container. Preferably the container is a standard shipping container. Preferably the container has a movable inner wall configured to engage with the goods. Preferably the movable inner wall comprises at least one inflatable member.

In yet another form, there is provided a method of loading a container comprising:
  locating at least a portion of a loading machine within a container;
  conveying a plurality of goods from outside the container to inside the container along a goods conveyor of the loading a loading and/or unloading machine;
  transferring the goods on a transfer system located at an end of the goods conveyor;
  manoeuvring the goods from the transfer system to the container.

Preferably the method further comprises the step of reorienting a portion of the goods. Preferably the method further comprise the step of reorientating a portion of the goods on the goods conveyor. Preferably the step of reorienting a portion of the goods comprises actuating an orientation device. Preferably actuating the orientation device comprises locating an orientation member over the goods conveyor such that at least a portion of the orientation member interrupts the path of the goods as they traverse the goods conveyor.

Preferably the method further comprises the step of aligning at least a portion of the goods. Preferably the method further comprises the step of aligning at least a portion of the goods on the conveyor. Preferably the step of aligning a portion of the goods comprises actuating an alignment device. Preferably actuating the alignment device comprises locating one or more alignment members over the goods conveyor. Preferably the alignment members engage with the goods and realign them as they traverse the goods conveyor. Preferably the step of aligning at least a portion of the goods occurs after the step of orientating a portion of the goods. Preferably the alignment device is arranged to align goods depending on the orientation of the goods.

Preferably the method further comprises the step of arranging a plurality of goods on a support platform. Preferably the step of arranging a plurality of goods on the support platform comprises a staging conveyor receiving goods from the goods conveyor and using the staging conveyor to arrange the goods along the support platform.

Preferably the method further comprises the step of adjusting the height of the transfer system to a predetermined unloading height. Preferably the predetermined unloading height corresponds to the highest available space that can receive the goods. Preferably highest available space that can receive the goods is determined using a goods height sensor. The step of adjusting the height of the transfer system preferably comprises adjusting the height of the transfer system to approximately adjacent to the height of goods already loaded into the container.

Preferably the step of manoeuvring the goods from the transfer system to the container comprises extending a transfer comb of the support platform with the goods thereon. Preferably the step of manoeuvring the goods from the transfer system to the container further comprises actuating a pusher. Preferably the step of manoeuvring the goods from the transfer system to the container further comprises withdrawing the transfer comb thereby pushing goods off the transfer comb into the container.

Preferably the pusher simultaneously pushes a plurality of goods located on the support platform of the transfer system. Preferably the goods are arranged substantially the width of the container and the pusher simultaneously pushes those goods along the width of the container. Preferably the step of actuating the pusher comprises extending a first pushing portion and a second pushing portion. Preferably the step of extending a first pushing portion and a second pushing portion comprises extending the second pushing portion further than the first pushing portion.

Preferably the method further comprises driving the loading machine within the container. Preferably the method comprises retracting the loading machine from a far end of the container after a column of goods has been constructed. Preferably the method comprises constructing a further column of goods adjacent to a constructed column of goods.

The method may further comprise the step of sorting the goods according to size. Preferably the goods are cartons of substantially the same width and depth and the step of sorting the goods according to size preferably comprises sorting the goods according to height. Preferably the method comprises loading larger smaller goods on top of larger goods.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
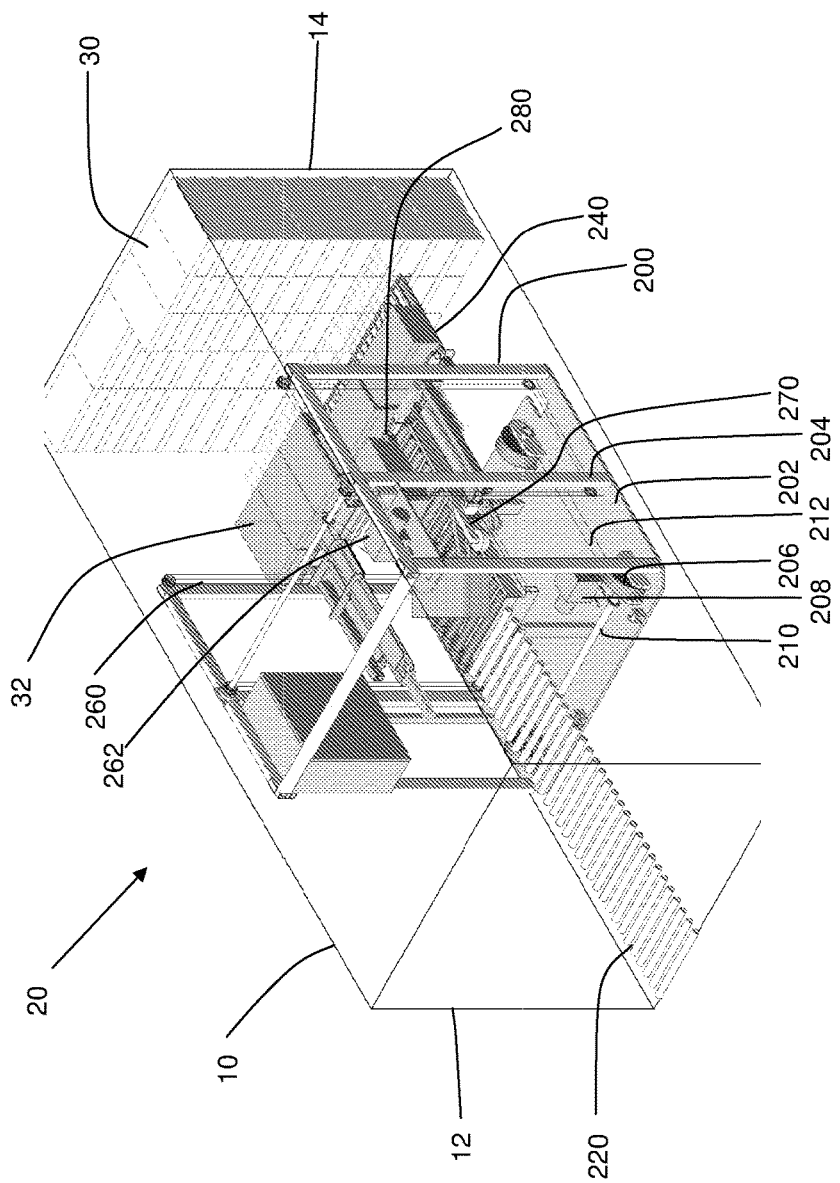
FIG. 1 illustrates a right side perspective view of a loading and/or unloading machine located inside a container.
Figure 2:
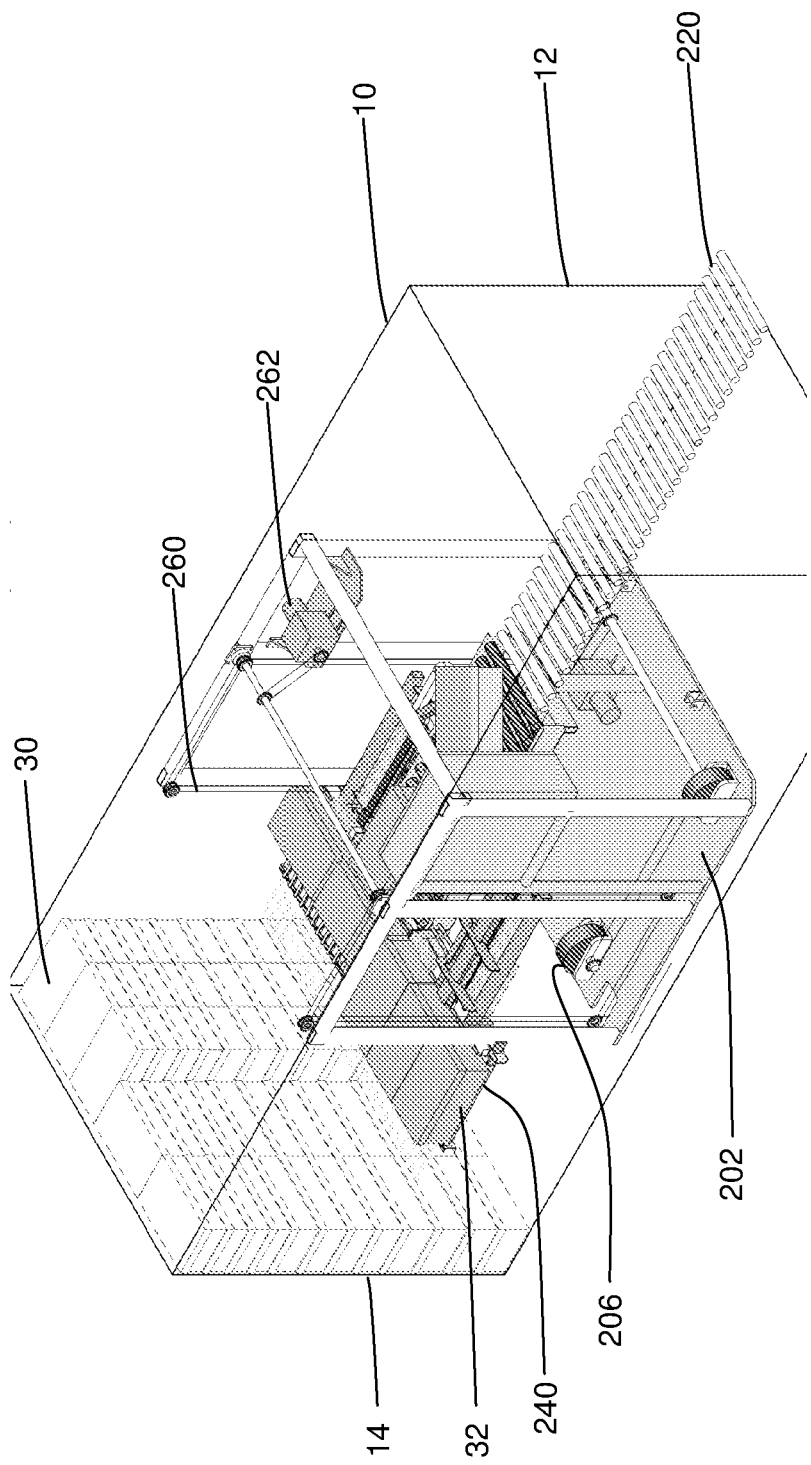
FIG. 2 illustrates a left side perspective view of the loading and/or unloading machine illustrated in FIG. 1.

FIGS. 1 and 2 illustrate a container 10 with a loading and/or unloading machine 20 located therein. The loading and/or unloading machine 20 will primarily be described with respect to loading a container and for convenience will therefore primarily be referred to as a loading machine 20. However, where the context permits no limitation is meant thereby and the loading machine 20 could instead of as well be an unloading machine when operated in a reverse manner to loading the container 10.

The container 10 is a standard freight container in the form of a shipping container. The loading machine 20 has a frame 200 which is approximately the same dimensions as an internal cross-section of the container 10. The frame has a floor 202 which supports framework 204 thereon. The framework 204 extends upwardly from the floor 202 and provides support for various components of the loading machine 20.

The frame 200 has a movement system, in the form of a plurality of wheels 206, that enables the loading machine 20 to traverse the interior space of the container 10. The wheels 206 are driven by motor 208. Two rear wheels 206 are driven simultaneously by the motor 208 by virtue of a common axel 210. The front wheels 206 may be driven as well by a belt or chain 212, or other suitable mechanism if desired. Alternatively, some of the wheels may be non-driven wheels.

The loading machine 20 has a goods conveyor 220 that extends from outside the container 10, through an entrance 12 of the container 10, to frame 200 of the loading machine 20 located inside the container 10. The goods conveyor 220 may connect to further conveyors outside the container 10. The goods conveyor 220 is substantially straight and aligns longitudinally with the container 10. The goods conveyor 220 is illustrated as being a roller conveyor, but it is envisaged that other conveyor mechanisms could be employed such as, for example, a belt conveyor.

A transfer system 240 is provided towards a loading end 14 of the container 10. As illustrated the container has a full height row of goods in the form of loaded cartons 30 and the transfer system 240 has a single height row of goods in the form of loading cartons 32 ready to be transferred to the container 10 adjacent to the already loaded cartons 30.

A height adjustment system 260 is provided which comprises various belts or chains connected by sheaves or sprockets to a height adjustment motor 262. The height adjustment system 260 is configured to raise and lower the transfer system 240 as the height adjustment motor 262 is actuated. In the illustrated embodiment the height adjustment system 260 includes four substantially vertical belts or chains that engage with a portions of the transfer system 240.

Figure 3:
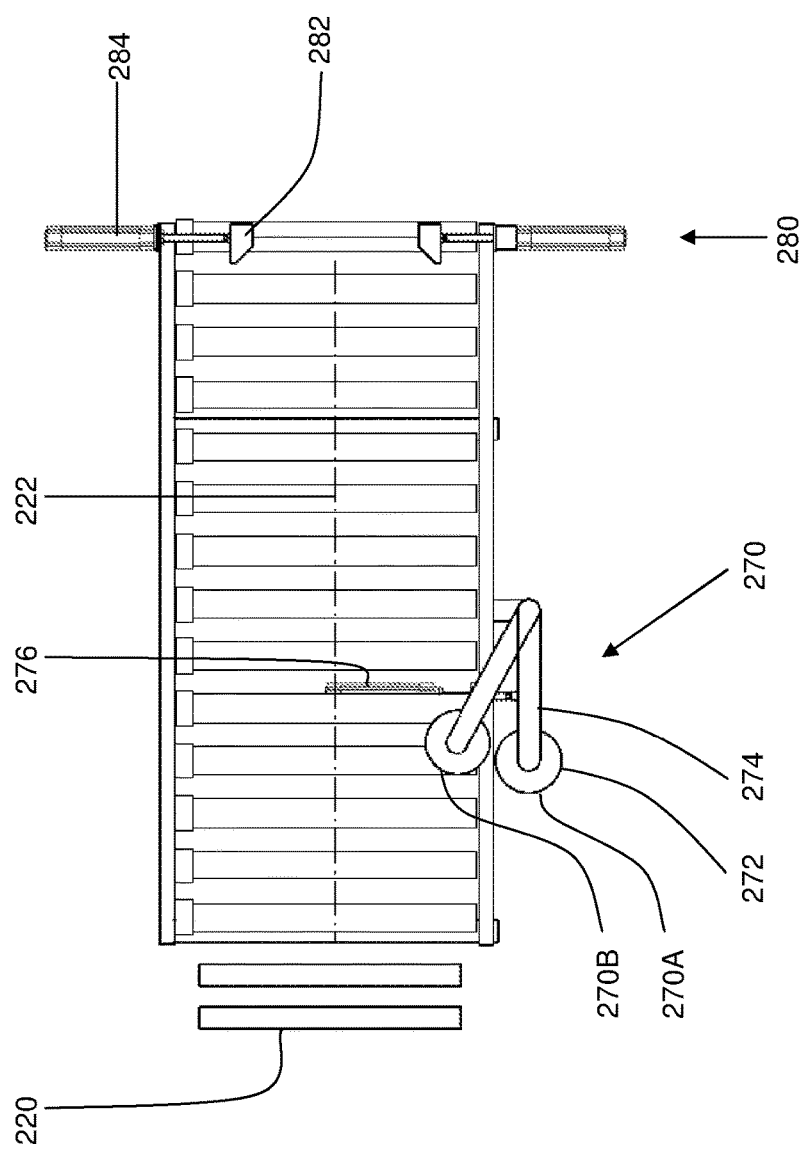
FIG. 3 illustrates a top plan view of an orientation device and alignment device.

An orientation device 270 and alignment device 280 are provided. The orientation device 270 and alignment device 280 are located above a portion of the goods conveyor 220 that is within the frame 200. The orientation device 270 and alignment device 280 can be seen more clearly in FIG. 3, which is a plan view of the portion of the goods conveyor 220 located within the frame 200 in FIGS. 1 and 2.

The orientation device 270 has an orientation member 272 with a roller 274 located at an end thereof. The orientation device 270 is illustrated in two positions, a non-reorientation position 270A and a reorientation position 270B. The non-reorientation position 270A locates the orientation device 270 out of the way of the goods conveyor 220 and the reorientation position 270B places the orientation device 270 over the goods conveyor 220. The orientation device 270 is rotated between the two positions by an orientation actuator 276 which is in the form of a hydraulic of pneumatic cylinder.

The alignment device 280 has two alignment members 282 located on opposite sides of the goods conveyor 220. Each alignment member 282 has an inclined surface that is at an angle to the longitudinal axis of the goods conveyor 220 and the direction of travel of goods thereon. The alignment members 282 each have a respective alignment actuator 284 which extends or retracts the alignment members 282 into or away from a central axis 222 of the goods conveyor 220.

Figure 4:
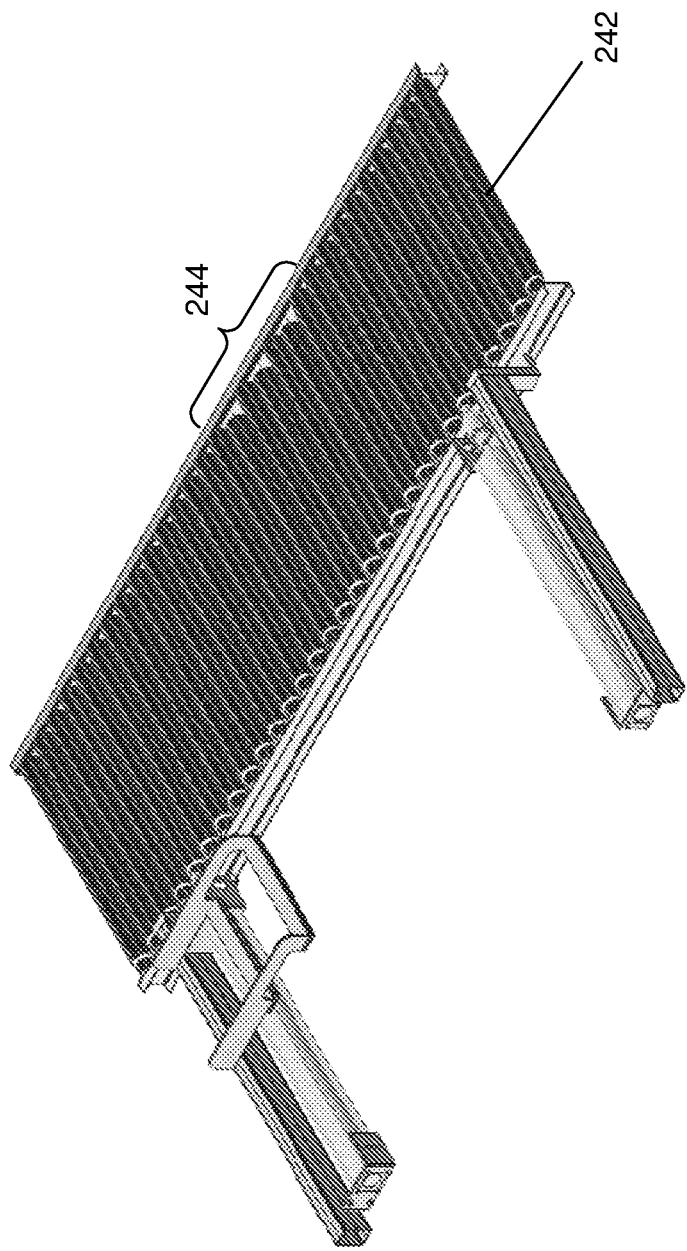
FIG. 4 illustrates a perspective view of a portion of a support platform.

FIGS. 4 to 7 illustrate portions of a support platform of the transfer system 240. FIG. 4 illustrates a portion of the support platform including a staging conveyor 242. The staging conveyor 242 extends substantially the width of the container 10 and is configured to distribute goods along the width of the staging conveyor 242. The staging conveyor 242 has a stopping portion 244 which allows a stopper to be raised and lowered to assist with distributing the goods as desired.

Figure 5:
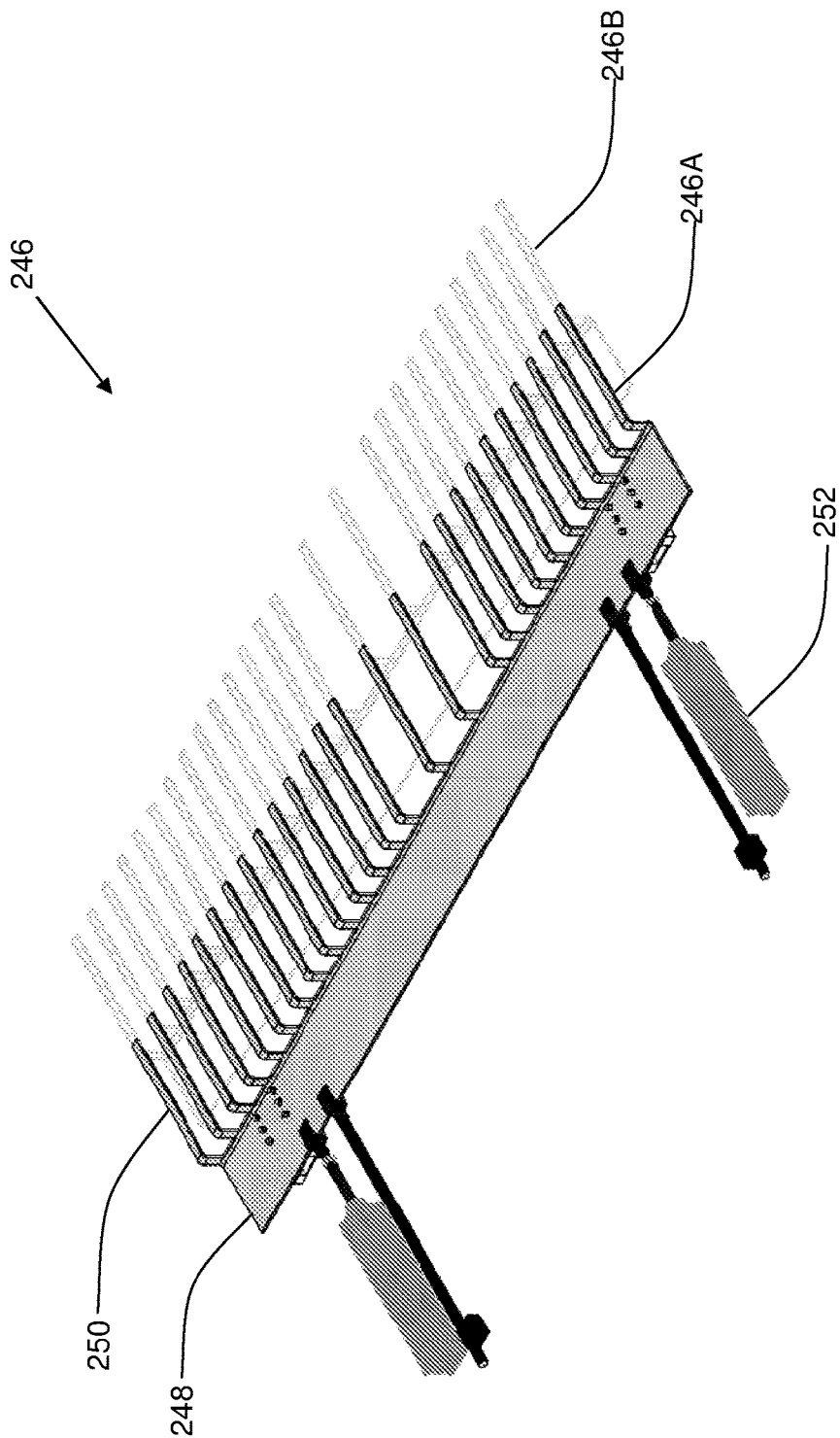
FIG. 5 illustrates a perspective view of a transfer comb.

FIG. 5 illustrates a transfer comb 246 which has a base 248 and a plurality of spaced apart ribs 250 extending from the base 248. The spaced apart ribs 248 are spaced to accord with the space between rollers of the staging conveyor 242 with larger spaces being provided for the stopping portion 244 of the staging conveyor 242. The transfer comb 246 can be moved using transfer actuators 252 in the form of hydraulic of pneumatic cylinders. As illustrated in FIG. 5 the transfer comb 246 can be moved between a retracted position 246A or an extended position 246B.

Figure 6:
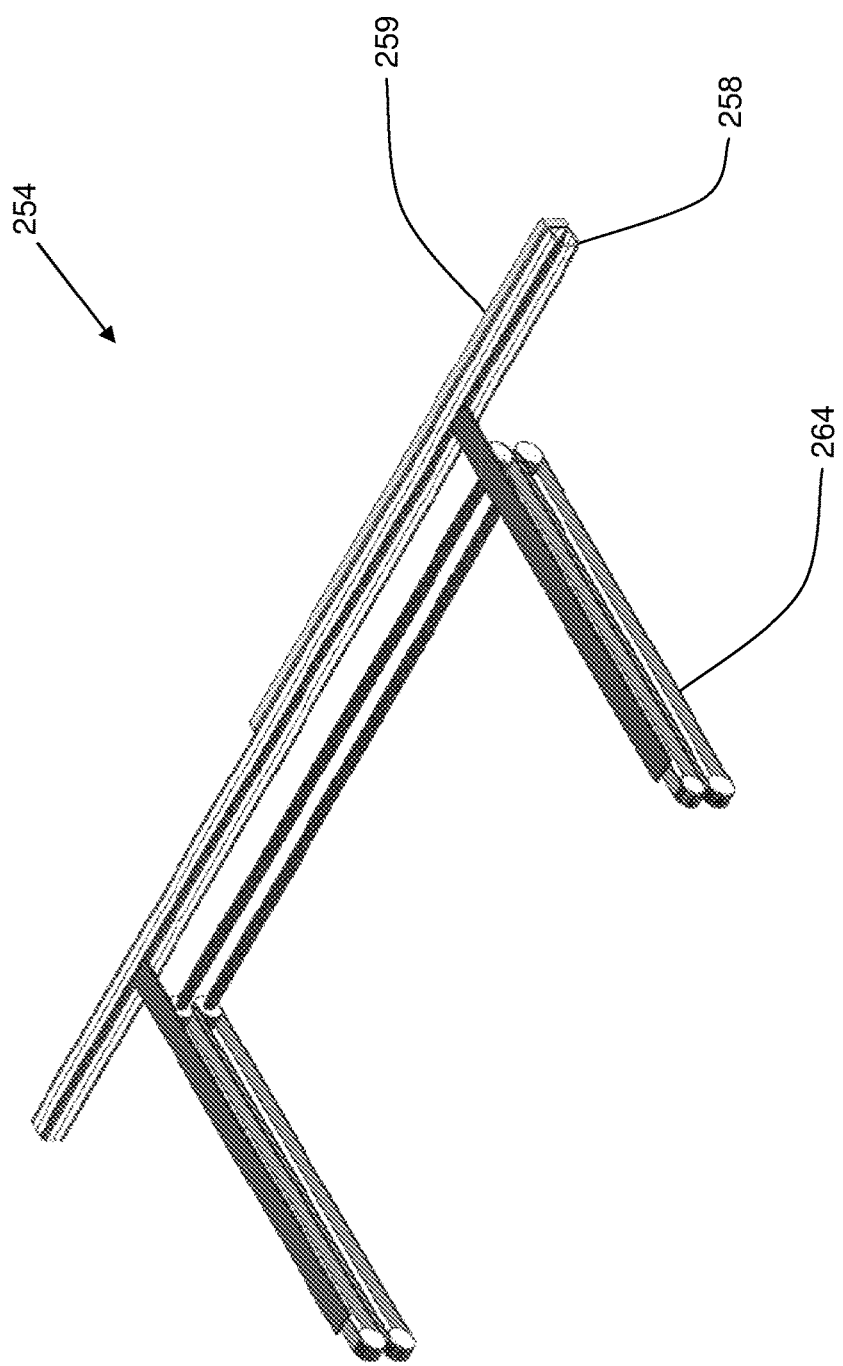
FIG. 6 illustrates a perspective view of a first portion of a pusher.
Figure 7:
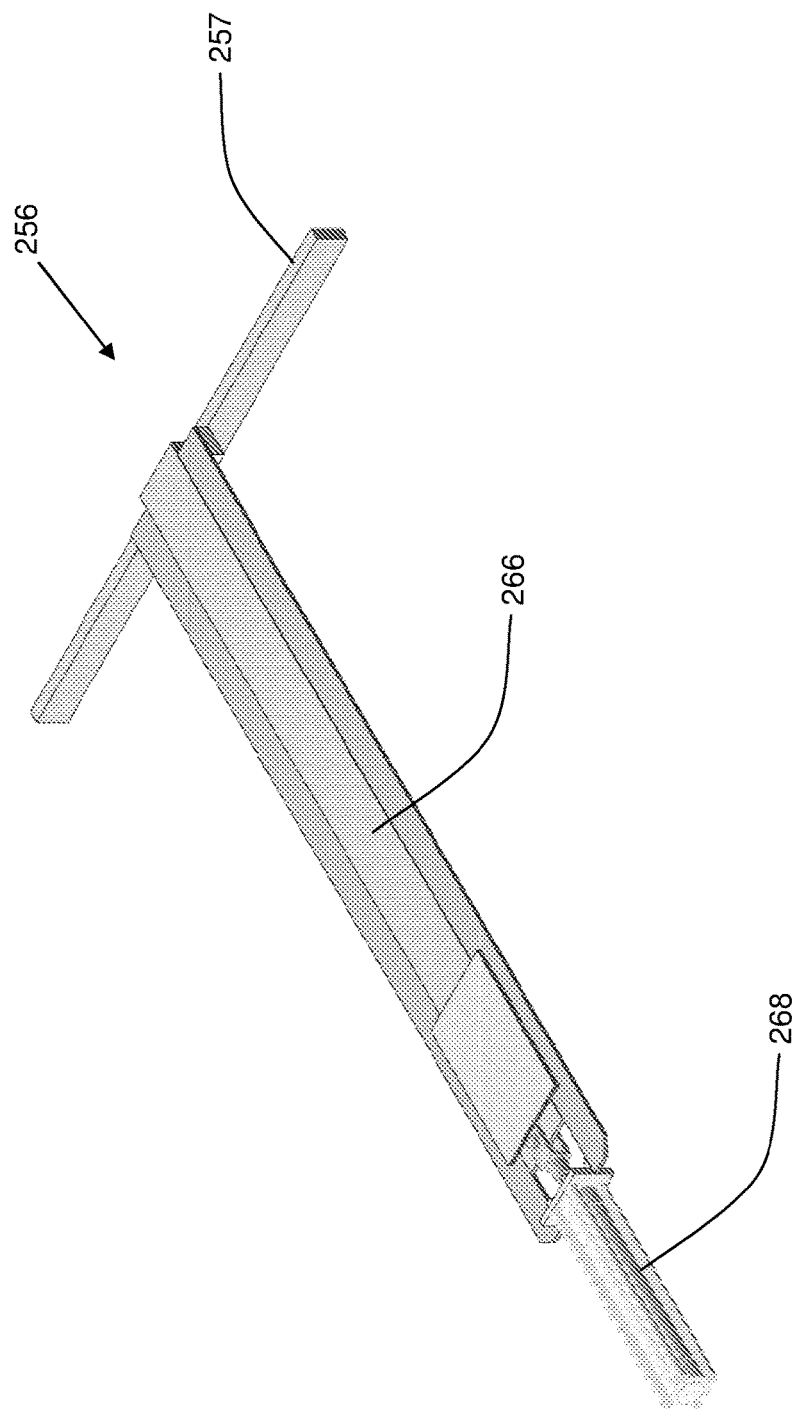
FIG. 7 illustrates a perspective view of a second portion of a pusher.

FIG. 6 illustrates a first portion of a pusher 254 and FIG. 7 illustrates a second portion of a pusher 256. The first portion of the pusher 254 has a pusher member 258 with a first pushing surface 255. The second pusher member 256 has a second pushing surface 257 which, when the first and second portions are coupled, is located next to the first pushing surface 255 against the pusher member 258.

The first portion of the pusher 254 is mechanically linked to a linear actuator 264 which is configured to causes the first portion of the pusher 254 and the second portion of the pusher 256 to move forward and backward. The second portion of the pusher 256 has an extender 266 coupled to an extender actuator 268 in the form of a hydraulic of pneumatic cylinder. The extender 266 is configured to extend the second pushing surface 257 of the second portion of the pusher 256 further than the first pushing surface 255 of the first portion of the pusher 254.

Figure 8:
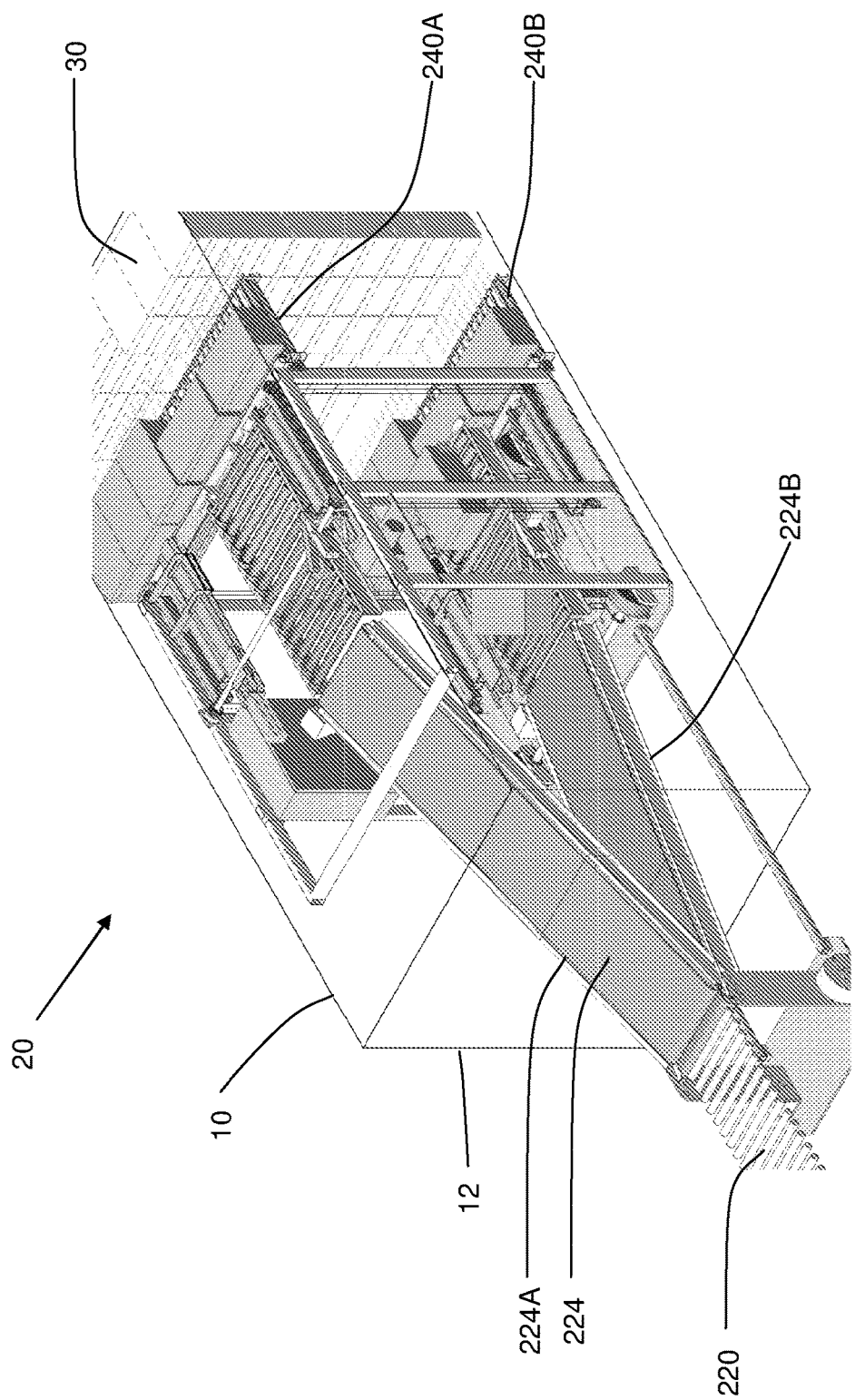
FIG. 8 illustrates a perspective view of a multi-level loading and/or unloading machine located inside a container.

FIG. 8 illustrates an alternative embodiment of a loading machine 20 having a multi-level transfer system which may position a portion of the goods conveyor 220 at different levels between an upper transfer position 240A and a lower transfer position 240B. The goods conveyor 220 has a ramp 224 which connects the goods conveyor 220 to a movable portion of the goods conveyor 220 located inside the frame 200. As the height of the movable portion of the goods conveyor 220 located inside the frame 200 is altered the angle of the ramp 224 varies as illustrated by having the ramp angled between in an upwards position 224A and a downwards position 224B for the upper transfer position 240A and a lower transfer position 240B, respectively.

In use, goods to be loaded are placed on the goods conveyor 220 and are then conveyed into the container 10. If needed, orders or codes of the goods can be accumulated first. If the goods are of different sizes they may be pre-sorted. For example, for the illustrated cartons the goods can be sorted by height. If cartons are delivered in a random order carton height sorting may be required. Standard carton base sizes should be determined with variable height cartons being sorted for equal height for each row.

In the illustrated example the goods cartons. Processing cartons 34 are being processed by the loading machine 20, loading cartons 32 are ready to be transferred to the container 10, and loaded cartons 30 are already loaded into the container 10. The processing cartons 34, loading cartons 32 and loaded cartons 30 are all the same type of cartons, and are merely numerated differently to express the stage in the process the illustrated cartons 30, 32, 34, are at. Although description will primarily relate to these cartons 30, 32, 24, it will be appreciated that the loading machine 20 may also be used for other types of goods.

Once cartons have been placed on the goods conveyor 220 the goods conveyor carries the cartons to the orientation device 270. In the illustrated example it is desired to have five cartons wide, three aligned longitudinally with the container 10 and two aligned perpendicularly to the container 10. The orientation device 270 therefore rotates the processing cartons 34 according to the desired orientation. If rotation of a processing carton 34 is desired the orientation device 270 interrupts the path of the processing carton 34 on the goods conveyor 220 which forces the processing carton 34 to rotate around roller 264 of the orientation device 270 by approximately 90°.

The processing carton 34 then progresses to the alignment device 280 which is extended or retracted depending on the orientation of the processing carton 34. If the processing carton 34 is to be aligned with the longitudinal axis of the container 10 then the alignment device 280 is extended. If the processing carton 34 is to be aligned perpendicularly to the container 10 then the alignment device 280 is retracted. Either way, if the carton is not aligned it will engage with the inclined surfaces of the alignment members 282 which will funnel the processing carton 34 into the desired alignment.

The processing carton 34 is then carried from the goods conveyor 220 to the transfer system 240. In particular, the processing carton 34 is conveyed from the goods conveyor 220 to the staging conveyor 242, of the transfer system 240, which is arranged substantially perpendicularly to the goods conveyor 220. The processing carton 34 is then moved along the staging conveyor 242 to its desired position.

In the illustrated example, the first carton is moved to the far left of the staging conveyor, the second carton is moved to the next leftmost position, the third carton is then moved to the next leftmost position, the fourth carton is moved to the far right, and the fifth and final carton is moved between the third and fourth cartons. Once all five cartons are arranged as desired they are ready for loading into the container 10 as illustrated as loading cartons 32.

Figure 9A:
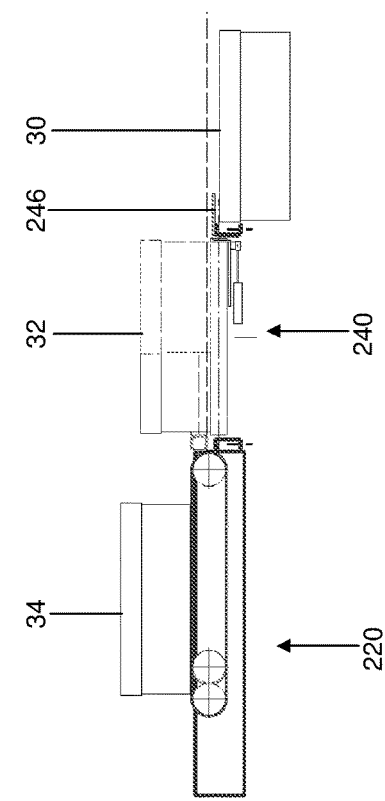
FIGS. 9A to 9D illustrate different stages of a process of transferring goods from a transfer system of the loading and/or unloading machine to a stack of goods within the container.
Figure 9B:
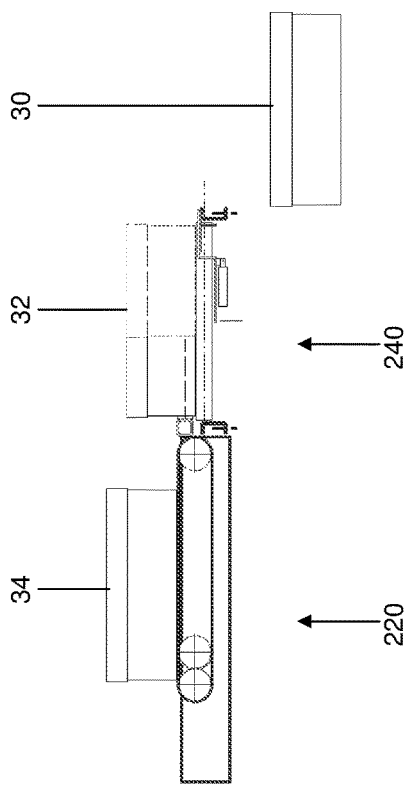

FIGS. 9A to 9D illustrate a process for transferring the loading cartons 32 from the transfer system 240 to the container 10. In particular, FIGS. 9A to 9D illustrate the loading cartons 32 being loaded on top of an existing row of loaded cartons 30. First, as illustrated in FIG. 9A, the cartons are processed (processing cartons 34) on the goods conveyor 220 and loaded onto the transfer system 240 (loading cartons) as described previously. Secondly, as illustrated in FIG. 9B, the height of the transfer system 240 is adjusted, preferably with the guidance of a height sensor that measures the height of the loaded cartons 30, such that the loading cartons 32 are located adjacent the top of the loaded cartons 30. The transfer comb 246 is extended and positioned on top of the loaded cartons 30.

Figure 9C:
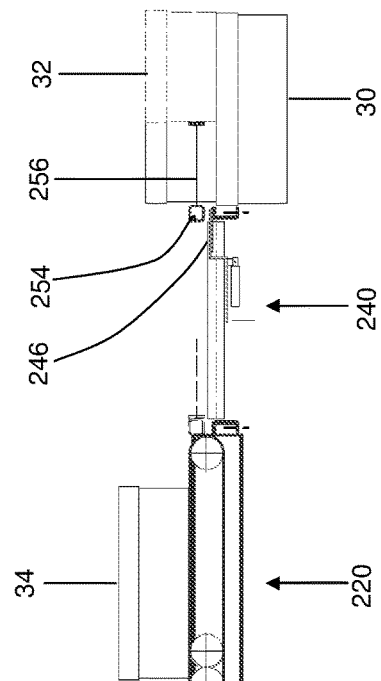
Figure 9D:
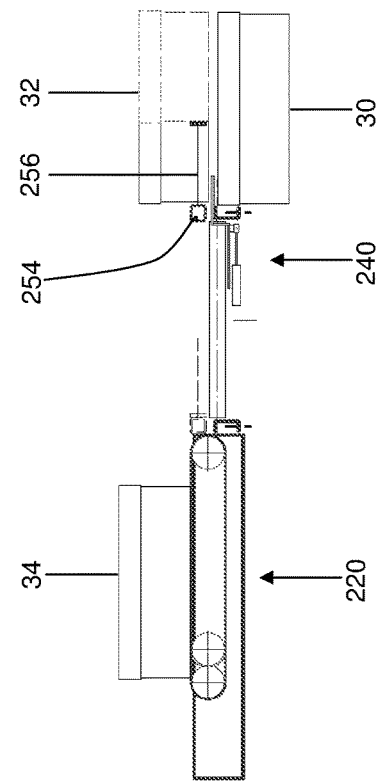

Turning to FIG. 9C, the pusher 254 is extended to push the loading cartons 32 from the staging conveyor 242 to the transfer comb 246 and loaded cartons 30. If needed, depending on the configuration of the cartons being transferred, the second portion of the pusher 256 may extend further to push the perpendicularly arranged cartons further such that a rear side of the transferred cartons 30 is aligned in a plane as shown in FIGS. 1 and 2. Then, as illustrated in FIG. 9D, the transfer comb 246 is retracted such that the loading cartons 32 rest solely on top of the loaded cartons 30. The pusher 254 is then retracted and the process can start again.

As the container 10 is loaded the loading machine 20 moves outwards from the container 10. Once fully loaded the container 10 can be closed and sealed ready for shipment. Preferably the container 10 has airbags (not illustrated) that inflate to snugly hold the goods inside the container 10.

Unloading is performed in a similar manner but in reverse, with the loaded cartons 30 being transferred to the transfer system 240 and then conveyed from the transfer system to goods conveyor 220 and then out of the container 10.

Advantageously, the present invention allows a container 10 to be loaded substantially automatically with little to no manual handling. The invention not only improves efficiency by loading a container quickly, but it also reduces damage to the goods through labourer mishandling and avoids injuries that may occur to labourers carrying the goods and/or working within the confined space of the container 10.

The loading machine 20 illustrated in FIG. 8 advantageously improves efficiency further by allowing the transfer system 240 to be adjusted to the next transfer height while the cartons are being received and processed on the goods conveyor 220 and arranged on the staging conveyor 242. The improved efficiency may be at the expense of having a longer loading machine 20 to cater for the ramp 224 of the goods conveyor 220.

The present invention is considered to be particularly advantageous for substantially regularly shaped goods such as cartons, preferably standard sized 25 kg meat cartons. In particular the illustrated example seeks to efficiently pack standard sized cartons into the container 10 in a particular arrangement which has different carton orientations to maximise the number of standard sized cartons that can be fitted inside a standard sized shipping container 10.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A loading and/or unloading machine comprising:
    a goods conveyor configured to convey goods into and/or out of a container;
    a transfer system located adjacent an end of the goods conveyor, the transfer system being configured to transfer goods from the loading machine into the container and/or from the container onto the loading machine;
    a height adjustment system configured to adjust the height of the transfer system to a desired height; and
    a staging conveyor;
    wherein the staging conveyor is located adjacent the goods conveyor and is configured to receive goods from the goods conveyor; and
    wherein the staging conveyor is transverse to the goods conveyor, whereby goods received from the goods conveyor can be selectively moved right or left and generally perpendicularly to a direction of movement of the goods conveyor.

2. The loading and/or unloading machine of claim 1, wherein the goods conveyor is configured to convey goods from outside the container into the container and wherein the transfer system is configured to manoeuvre goods from the loading machine into the container.

3. The loading and/or unloading machine of claim 1, wherein the goods conveyor is configured to convey goods from inside the container to outside the container and wherein the transfer system is configured to manoeuvre goods from the container onto the loading machine.

4. The loading and/or unloading machine of claim 1 wherein the transfer system comprises a support platform.

5. The loading and/or unloading machine of claim 4, wherein the support platform comprises a transfer comb.

6. The loading and/or unloading machine of claim 4, wherein the transfer system comprises a pusher configured to push goods off the support platform.

7. The loading and/or unloading machine of claim 6, wherein the pusher comprises a first pushing portion and a second pushing portion.

8. The loading and/or unloading machine of claim 7, wherein the second pushing portion comprises an extender that enables the second pushing portion to extend further than the first pushing portion.

9. The loading and/or unloading machine of claim 4, wherein the staging conveyor arranges the goods along the support platform.

10. The loading and/or unloading machine of claim 1, further comprising a goods alignment device to align the goods on the goods conveyor.

11. The loading and/or unloading machine of claim 10, wherein the goods alignment device comprises one or more alignment members that extend over the goods conveyor.

12. The loading and/or unloading machine of claim 11, wherein the alignment members have an inclined surface relative to a longitudinal axis of the goods conveyor and wherein the alignment members are movable to extend or retract across a path of the goods conveyor.

13. The loading and/or unloading machine of claim 1, further comprising a goods orientation device to orient the goods in a desired orientation.

14. The loading and/or unloading machine of claim 13, wherein the goods orientation device selectively reorients goods by rotating the goods by approximately 90°.

15. The loading and/or unloading machine of claim 13, wherein the goods orientation device comprises a goods orientation member that selectively interrupts a path of the goods as they traverse the goods conveyor.

16. The loading and/or unloading machine of claim 15, wherein the goods orientation member is a device for rotating and aligning the goods.

17. The loading and/or unloading machine of claim 1, wherein the goods conveyor comprises at least one ramp that extends between a first height portion of the goods conveyor and a second height portion of the goods conveyor.

18. The loading and/or unloading machine of claim 17, wherein the first height portion of the goods conveyor is a fixed height portion and the second height portion of the goods conveyor is a variable height portion.

19. The loading and/or unloading machine of claim 1, wherein the height adjustment system comprises a goods height sensor configured to determine a height of goods already loaded into the container.

20. The loading and/or unloading machine of claim 1, further comprising:
    a frame that supports at least the transfer system and height adjustment system; and
    a movement system configured to move the frame within the container.

21. A loading and/or unloading machine comprising:
    a goods conveyor configured to convey goods into and/or out of a container;
    a transfer system located adjacent an end of the goods conveyor, the transfer system being configured to transfer goods from the loading machine into the container and/or from the container onto the loading machine; and a height adjustment system configured to adjust the height of the transfer system to a desired height, the machine further comprising a plurality of transfer systems located at different heights in parallel planes.

22. A container loading and/or unloading system comprising:
- a container to be loaded or unloaded with a plurality of goods; and
- a loading and/or unloading machine comprising:
  - a goods conveyor extending into the container and configured to convey goods from outside the container into the container and/or from inside the container to outside the container;
  - a transfer system located adjacent an end of the goods conveyor, the transfer system being configured to manoeuvre goods from the loading machine into the container and/or from the container onto the loading machine;
  - a height adjustment system configured to adjust the height of the transfer system to a desired height; and
  - a staging conveyor;
  - wherein the staging conveyor is located adjacent the goods conveyor and is configured to receive goods from the goods conveyor; and
  - wherein the staging conveyor is transverse to the goods conveyor, whereby goods received from the goods conveyor can be selectively moved right or left and generally perpendicularly to a direction of movement of the goods conveyor.

\* \* \* \* \*

UNITED STATES PATENT AND TRADEMARK OFFICE
CERTIFICATE OF CORRECTION

PATENT NO. : 10,294,046 B2  
APPLICATION NO. : 15/561475  
DATED : May 21, 2019  
INVENTOR(S) : John E. Hart Page 1 of 1

It is certified that error appears in the above-identified patent and that said Letters Patent is hereby corrected as shown below:

On the Title Page

Item [30], delete "201501060" and insert -- 2015901060 --

Signed and Sealed this  
Twelfth Day of November, 2019

Andrei Iancu  
*Director of the United States Patent and Trademark Office*